United States Patent Office 3,155,133
Patented Nov. 3, 1964

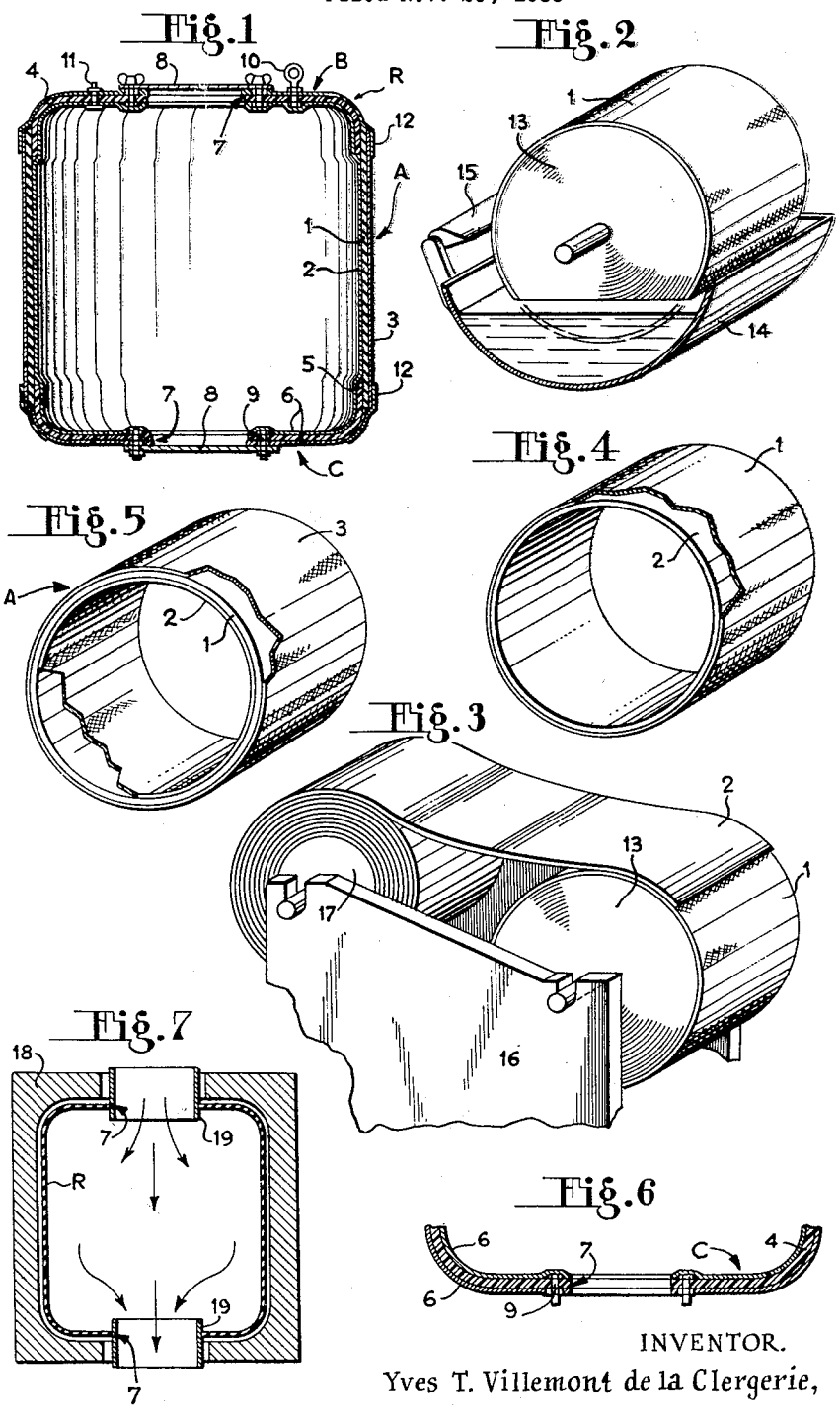

3,155,133
FLEXIBLE CONTAINERS AND PROCESS FOR THEIR MANUFACTURE
Yves Timothée Villemonte de la Clergerie, Chalette-sur-Loing, France, assignor to Etablissements Hutchinson (Compagnie Nationale du Caoutchouc), Paris, France, a French body corporate
Filed Nov. 20, 1959, Ser. No. 854,347
Claims priority, application France, Nov. 20, 1958, 779,689, Patent 1,215,872
17 Claims. (Cl. 150—.5)

The present invention relates to flexible containers which are suitable for transporting fluids and materials in powder form and which, when empty, may be folded in concertina fashion so as to occupy a minimum of space.

It has already been proposed to produce containers of this type in the form of barrels in which the lateral cylindrical wall and the ends are formed from thicknesses of rubberised fabric assembled and joined together in the same manner as those used for the carcasses of pneumatic tyres.

These formerly produced vessels however had serious defects. Quite apart from the complexity of their manufacture, it was difficult for them to remain balanced on the flexible bottom when full, as their overall rigidity was insufficient. Moreover it is difficult for metallic components intended for filling and handling, to be fitted into these end members in fluid-tight manner.

The invention aims at remedying these defects. For this purpose, it has for its object a container having a rubberized flexible cylindrical body, characterized by the fact that it comprises two rigid ends, preferably of laminated material and advantageously rubberized at their inner face at least, each of them being inserted in the extremities of the body, to which they are joined by vulcanization.

According to another characteristic, the cylindrical body is composed of a tubular fabric provided on each face with a covering of rubber.

The invention also has for its object a process of manufacture which is noteworthy in that it consists in covering a tubular fabric with a sheet of rubber on each of its faces, inserting a rigid end member preferably of laminated material and advantageously rubberized at least on its inner face, into each extremity of the rubberized cylindrical body thus formed, and in vulcanizing the end members and the body together to cause the two end members to adhere to the body.

It will be clearly apparent from the foregoing that the flexible container according to the invention eliminates the difficulties encountered heretofore both in the employment as well as the manufacture of the formerly known flexible containers, by reason of these rigid end members and of their being mounted in a flexible cylinder having a tubular shell.

Other features and advantages of the invention will be apparent from the detailed description of one of its embodiments.

Reference is made to the accompanying drawing, given solely by way of example, in which:

FIG. 1 shows this embodiment in axial section;
FIGS 2 and 3 illustrate two stages of manufacture of the cylindrical body of the container;
FIGS. 4 and 5 are perspective views of the cylindrical body in two stages of its manufacture;
FIG. 6 is an axial section through one of the ends of the container and FIG. 7 shows the final stage of manufacture of the container.

Accordingly to the embodiment indicated, the container R comprises a cylindrical or tubular body A and two ends B and C closing this body at each of its extremities.

The body A comprises a tubular fabric 1 coated on each of its faces with a layer or sheet of rubber, 2 and 3 respectively. The fabric is woven in the form of a continuous tube, the warp threads constituting the formers of a cylinder and the weft thread being wound round them in a helix. Any fiber having good elasticity and strength characteristics may be employed for forming this tube. However, preference is given to superpolyamides, such as nylon which besides having these qualities, also have the property of shrinking when they approach 130° C., and this feature can be used to advantage as will be seen later.

Each end member B or C is formed by a rigid core 4, preferably of laminated material composed of glass fiber coated with resin. As a matter of fact, these stratified materials in addition to their great mechanical strength and their high resistance to impacts and chemical agents, also have the property, under certain conditions, of adhering perfectly to rubber during vulcanization.

Each core 4 is circular and comprises a peripheral flange 5 which is adapted to be inserted into the corresponding extremity of the body A. It is coated on each face with a layer of rubber 6 and the outer diameter of the core 4 thus covered, is substantially equal to the inner diameter of the body A.

Each end member also comprises a central filling or emptying aperture 7 closed by a cover 8 of the same material as the core 4. The cover 8 is fixed by bolts 9 anchored in the core 4, a tight seal being ensured by the rubber layers or coverings 6.

The top end B is moreover provided with a lifting ring 10 and with a valve 11 enabling air or other gas to be introduced into the container R when it is not full. The ring 10 and the valve 11 are fixed to the core 4 in the same manner as the bolts 9, but the valve 11 discharges into the interior of the container R.

The container is completed by two strips of rubber 12 fixed to the outer wall of the body A on a level with the joint between the latter and the top and bottom ends B and C.

The manner in which the manufacture of the container R is carried out will now be considered.

In a commencing stage (FIG. 2) the tubular fabric 1 is wound on a rotating cylindrical former or drum 13, the lower portion of which dips into a solution of rubber in a solvent such as petroleum spirit, contained in a trough 14. During rotation of the drum 13, a scraper 15 ensures that the tube 1 is uniformly coated with the solution. The solution is rendered tacky by evaporation of the solvent in the known manner with or without heating. The second stage (FIG. 3) consists in applying the sheet of rubber 2 to the tube 1 thus rendered adhesive. To do this, a cylinder 17 provided with a wrapping of rubber is placed in a mounting 16 with its axis parallel to that of the drum 13. Thus upon rotating the drum 13 to coat the tube 1 with the sheet of rubber 2 which is raw, the latter is wound off the cylinder 17 on which it is stored.

The tube 1 provided with its sheet 2 is then removed from the drum 13 and turned inside out. This results in the element shown in FIG. 4 where the sheet 2 is on the inside of the tube 1.

The element composed of the tube 1 and sheet 2 is again slipped on to the drum 13 and the tube 1 is covered with its outer sheet 3 in the manner just described for applying the sheet 2 to the tube 1.

FIG. 5 illustrates the tube which is thus produced and which is then cut to the desired size to form the body A.

The end members B and C are then made as follows (see FIG. 6 showing the bottom end member C by way of example). Each core 4, shaped by moulding to the appropriate form and provided with its metallic insertions such as the bolts 9, is coated with an adhesive on both its faces. When this core 4 is of a stratified material, this adhesive may advantageously be in the form of a solution of neoprene with 5 to 10% of an isocyanate added to it, such as the product sold commercially under the designation "Desmodur." The covering of rubber 6 is then applied to each face of the core 4.

Then in order to produce the container R, the end members B and C are inserted in the extremities of the body A shown in FIG. 5, this body being sufficiently rigid to permit this insertion without difficulty. It is also possible to make this insertion whilst the body A is mounted on the drum 13, if the latter is able to contract radially; in fact this enables the contracted drum to be withdrawn from the container through the openings 7.

With the ends B and C inserted, strips of rubber 12 are placed in position and the whole assembly is vulcanized. This vulcanization may be carried out in a hot-air stove at a pressure of 3 to 4 kg. sq. cm. (approx. 43–57 lbs. per sq. inch) at a temperature of 130° C.

It may also be done as illustrated in FIG. 7, in a two-part mould 18 fitting round the outside of the container R. Advantage may be taken of the apertures 7 in order to introduce saturated steam in the direction of the arrows at a pressure of 3 to 5 kg./sq. cm. (approx. 40 to 70 lbs. per sq. inch) into the container R and extract the condensation water through the medium of the branches 19.

The effect of vulcanization is to unite the various rubber layers or sheets 2, 3, 6 and strips 12 together. As a consequence the contraction of the tube 1 undergoes if it is of a superpolyamide material for the reason mentioned hereinbefore, a close contact between the flanges 5 and the body A and an excellent adhesion of the latter is obtained. Thus, once the covers 8 are placed in position, a fluid-tight container is obtained, capable of withstanding pressures higher than 14 lbs. per sq. inch, even when the height of the flanges is as little as ¾".

The flexible container according to the invention, while offering the same possibilities of folding, when empty, as the flexible vessels known heretofore, has an improved behaviour when in use and a better balance when in the full condition.

Moreover, the method of manufacture is much simpler.

Of course, the invention is not limited to the embodiment shown and described, which has only been given by way of example.

Thus, in particular the end members B and C may be covered with rubber on their inner face only or they may even be completely without rubber.

As a matter of fact, the stratified material of which they are composed has of itself sufficient resistance to various chemical agents. Moreover it may be adhered directly to the inner layer or sheet 2 of the body A, if it is coated with the adhesive product "Desmodur" mentioned above.

Having now described my invention what I claim as new and desire to secure by Letters Patent is:

1. A flexible container having an axis and comprising two coaxial wholly rigid end members, each end member having an outer face including a cylindrical portion, a flexible tubular fabric body coaxial with the end members and having an inner face including annular end portions which encompass said cylindrical portions of the end members, and a continuous integral layer of rubber coextensive with and adhered to the inner face of the body and coextensive with and adhered to at least a part of the outer faces of the end members, whereby the rubber layer forms between the end members and body a perfectly sealed joint which is highly resistant to pressure inside the container.

2. A flexible container having an axis and comprising two coaxial wholly rigid end members, each end member having an outer face including a cylindrical portion, a flexible tubular fabric body coaxial with the end members and having an inner face including annular end portions which encompass said cylindrical portions of the end members, and a continuous integral layer of rubber coextensive with and adhered to the inner face of the body and coextensive with and adhered to at least a part of the outer faces of the end members, the tubular body in the region of said end portions being under circumferential tension.

3. A flexible container having a longitudinal axis and comprising a rubber body in one continuous piece consisting of a cylindrical wall portion and two transversely extending end wall portions, two coaxial wholly rigid end members respectively coextensive with and adhered to the end wall portions, the cylindrical wall portion having two annular end parts respectively coextensive with and adhered to the end members, and a woven tubular reinforcing fabric embedded in the cylindrical wall portion and having substantially the same axial extent as the cylindrical wall portion so that the two ends of the reinforcing fabric encompass said rigid end members.

4. A flexible container having a longitudinal axis and comprising a rubber body in one continuous piece consisting of a cylindrical wall portion and two transversely extending end wall portions, two coaxial wholly rigid end members respectively coextensive with and adhered to the end wall portions, the cylindrical wall portion having two annular end parts respectively coextensive with and adhered to the end members, a woven tubular reinforcing fabric embedded in the cylindrical wall portion and having substantially the same axial extent as the cylindrical wall portion so that the two ends of the reinforcing fabric encompass said rigid end members and a layer of rubber coextensive with and adhered to the inner face of each end member.

5. A flexible container as claimed in claim 4, wherein one of the end members includes a container filling aperture and a closing element for the aperture, clamping means for detachably clamping the closing element to the container being mounted in said one of the end members and a fluid-tight seal being provided between said one of the end members and the clamping means by the layer of rubber coextensive with the inner face of said one of the end members.

6. A flexible container as claimed in claim 4, further comprising a lifting member for lifting the container mounted in one of the end members, a fluid-tight seal being provided between the lifting member and said one of the end members by said layer of rubber coextensive with the inner face of said one of the end members.

7. A flexible container having a longitudinal axis and comprising a rubber body in one continuous piece consisting of a cylindrical wall portion and two transversely extending end wall portions, two coaxial wholly rigid end members respectively coextensive with and adhered to the end wall portions, the cylindrical wall portion having two annular end parts respectively coextensive with and adhered to the end members, and a woven tubular reinforcing fabric of superpolyamide embedded in the cylindrical wall portion and having substantially the same axial extent as the cylindrical wall portion so that the two ends of the reinforcing fabric encompass said rigid end members, said annular end portions being under circumferential tension.

8. A flexible container having a longitudinal axis and comprising a rubber body in one continuous piece consisting of a cylindrical wall portion and two transversely extending end wall portions, two coaxial wholly rigid cup-shaped end members of glass fiber respectively coextensive with and adhered to the end wall portions, the cylindrical wall portion having two annular end parts respectively coextensive with and adhered to the end members, a woven tubular reinforcing synthetic plastic fabric embedded in the cylindrical wall portion and having substantially the same axial extent as the cylindrical wall portion so that the two ends of the reinforcing fabric encompass said rigid end members and a layer of rubber coextensive with and adhered to the inner face of each end member.

9. Process of producing a container consisting of the steps of: adhering a layer of rubber on the inner face and on the outer face of a flexible tube of woven fabric, adhering a layer of rubber on at least one face of each of two rigid end members, inserting the end members in the ends of the flexible tube so that the layers of rubber on the end members come in contact with the layer of rubber on the inner face of the tube and vulcanizing the layers of rubber so as to hold the tube and end members together.

10. Process of producing a container comprising: applying an adhesive to the inner and outer faces of a flexible tube of woven fabric, applying a rubber layer on the adhesive-coated inner face and on the adhesive-coated outer face of the tube, securing a layer of rubber on the face of each of two cup-shaped rigid end members which is intended to be the outer face of the end member in the finished container, inserting the end members in the ends of the flexible tube so that the layers of rubber on the end members come in contact with the layer of rubber on the inner face of the tube and vulcanizing the layers of rubber so as to hold the tube and end members together.

11. Process of producing a container comprising: placing a flexible tube of woven fabric on a drum, coating the outer face of the tube with an adhesive, winding a sheet of rubber round the adhesive-coated tube and securing the sheet to the latter by means of the adhesive, removing the tube from the drum and turning the tube inside out, placing the turned tube on the drum, coating the outer face of the turned tube with an adhesive, winding a sheet of rubber round the adhesive-coated tube and securing the sheet to the latter by means of the adhesive, removing the tube and the rubber sheets secured thereto from the drum, coating the side of each of two cup-shaped rigid end members which is intended to be the outer side of the end member in the final container with an adhesive, applying a rubber layer to the adhesive-coated side of each end member, inserting the end members in the ends of the tube so that the rubber layers come in contact with the rubber sheet on the inner face of the tube, and vulcanizing the rubber layers and rubber sheets so as to secure the end members to the tube.

12. Process of producing a container comprising: adhering a layer of rubber on the inner face and on the outer face of a flexible woven tube, adhering a layer of rubber on at least one face of each of two rigid end members, inserting the end members in the ends of the flexible tube so that the layers of rubber on the end members come in contact with the layer of rubber on the inner face of the tube and vulcanizing the layers of rubber so as to hold the tube and end members together.

13. Process of producing a container comprising: adhering a layer of rubber on the inner face and on the outer face of a flexible woven tube which is shrinkable upon application of rubber vulcanizing heat, adhering a layer of rubber on both faces of each of two rigid cup-shaped end members, inserting the end members in the ends of the flexible tube so that the layers of rubber on the end members come in contact with the layer of rubber on the inner face of the tube and vulcanizing the layers of rubber so as to hold the tube and end members together and thereby cause the ends of the flexible woven tube to shrink round the end members.

14. Process of producing a container consisting of the steps of: adhering a layer of rubber on the inner face and on the outer face of a tube of woven fabric, adhering a layer of rubber on at least one face of each of two rigid end members each having a cylindrical flange, inserting the cylindrical flanges of the end members in the ends of the flexible tube so that the layers of rubber on the end members come in contact with the layer of rubber on the inner face of the tube and vulcanizing the layers of rubber so as to hold the tube and end members together.

15. Process of producing a container consisting of the steps of: adhering a layer of rubber on the inner face and on the outer face of a tube, of woven fabric, forming a filling opening in at least one of two rigid end members, mounting in the end member having the opening closing means for the opening, coating both faces of each end member with an adhesive, applying a rubber layer to the whole of the adhesive-coated faces of each end member, inserting the end members in the ends of the flexible tube so that the rubber layers on the end members are disposed on the inside of the container and come in contact with the rubber layer on the inner face of the tube and vulcanizing the rubber layers so as to secure the end members to the tube in fluid-tight manner and render the mounting of the closing means fluid-tight.

16. Process of producing a container comprising: placing a tube of woven fabric on a drum, coating the outer face of the tube with an adhesive, winding a sheet of rubber round the adhesive-coated tube and securing the sheet to the latter by means of the adhesive, removing the tube from the drum and turning the tube inside out, placing the turned tube on the drum, coating the outer face of the turned tube with an adhesive, winding a sheet of rubber round the adhesive-coated tube and securing the sheet to the latter by means of the adhesive, removing the tube and the rubber sheets secured thereto from the drum, coating each of two rigid end members of glass fiber material each having a cylindrical flange face of each end member with a solution of neoprene containing an isocyanate, securing to the whole of each face of each end member including the flange a layer of rubber by means of said solution, inserting the flanges of the end members in the ends of the tube so that the layers of rubber come in contact with said sheets of rubber, placing a bond of rubber round each end of the tube in such manner as to overlap the end of the tube and the adjacent end member, placing the assembled tube and end members in a vulcanizing device and vulcanizing said sheets of rubber, layers of rubber and bands of rubber together so as to secure the end members to the tube in a fluid-tight manner.

17. Process of producing a container comprising: bonding a layer of rubber on the inner face and on the outer face of a tube of fabric bonding a layer of rubber on the whole of both faces of each of two rigid cup-shaped end members one of which members has an aperture, inserting the end members in the ends of the tube in such manner that the layers of rubber on the end members are inside the container and come in contact with the layer of rubber on the inner face of the tube, placing the tube and end members in a vulcanizing mould having a moulding cavity corresponding to the desired outer shape of the container, filling the tube and the end members inserted in the latter with steam under pressure and vulcanizing said layers of rubber so as to secure the end members to the tube.

(References on following page)

References Cited in the file of this patent

UNITED STATES PATENTS

| | | |
|---|---|---|
| 1,678,330 | Clyne | July 24, 1928 |
| 2,041,357 | Kraft | May 19, 1936 |
| 2,092,772 | Nadelson | Sept. 14, 1937 |
| 2,312,993 | Stephens | Mar. 2, 1943 |
| 2,393,347 | Stuart et al. | Jan. 22, 1946 |
| 2,612,924 | Cunningham | Oct. 7, 1952 |
| 2,615,487 | Cunningham | Oct. 28, 1952 |
| 2,644,198 | Crawford | July 7, 1953 |
| 2,766,164 | Salem | Oct. 9, 1956 |
| 2,815,784 | Cunningham | Dec. 10, 1957 |
| 2,854,048 | Cunningham | Sept. 30, 1958 |
| 3,010,602 | Randolph | Nov. 28, 1961 |

FOREIGN PATENTS

| | | |
|---|---|---|
| 119,303 | Great Britain | Oct. 3, 1918 |